US009678752B2

(12) United States Patent
Jin

(10) Patent No.: US 9,678,752 B2
(45) Date of Patent: Jun. 13, 2017

(54) SCHEDULING APPARATUS AND METHOD OF DYNAMICALLY SETTING THE SIZE OF A ROTATING REGISTER

(71) Applicant: SAMSUNG ELECTRONICS CO., LTD., Suwon-si (KR)

(72) Inventor: Tai-Song Jin, Seoul (KR)

(73) Assignee: SAMSUNG ELECTRONICS CO., LTD., Suwon-Si (KR)

(*) Notice: Subject to any disclaimer, the term of this patent is extended or adjusted under 35 U.S.C. 154(b) by 455 days.

(21) Appl. No.: 14/258,526

(22) Filed: Apr. 22, 2014

(65) Prior Publication Data
US 2014/0317627 A1    Oct. 23, 2014

(30) Foreign Application Priority Data
Apr. 22, 2013    (KR) .................. 10-2013-0044432

(51) Int. Cl.
| G06F 15/00 | (2006.01) |
| G06F 7/38 | (2006.01) |
| G06F 9/00 | (2006.01) |
| G06F 9/44 | (2006.01) |
| G06F 9/30 | (2006.01) |

(52) U.S. Cl.
CPC ...... *G06F 9/30123* (2013.01); *G06F 9/30112* (2013.01); *G06F 9/30134* (2013.01); *G06F 9/30138* (2013.01); *G06F 9/30189* (2013.01)

(58) Field of Classification Search
None
See application file for complete search history.

(56) References Cited

U.S. PATENT DOCUMENTS

| 5,564,031 A * | 10/1996 | Amerson | G06F 7/72 711/110 |
| 6,230,317 B1* | 5/2001 | Wu | G06F 8/4452 717/161 |
| 6,651,247 B1* | 11/2003 | Srinivasan | G06F 8/4452 712/226 |
| 2001/0042190 A1* | 11/2001 | Tremblay | G06F 9/30098 712/208 |
| 2004/0025153 A1 | 2/2004 | Johnson et al. | |
| 2004/0221283 A1 | 11/2004 | Worley | |
| 2007/0169032 A1* | 7/2007 | Kim | G06F 8/441 717/140 |
| 2009/0113184 A1 | 4/2009 | Martin | |
| 2011/0238963 A1* | 9/2011 | Kim | G06F 9/3012 712/229 |
| 2012/0089823 A1 | 4/2012 | Jin et al. | |

FOREIGN PATENT DOCUMENTS

KR   10-2012-0036210 A    4/2012

* cited by examiner

*Primary Examiner* — George Giroux
(74) *Attorney, Agent, or Firm* — Sughrue Mion, PLLC

(57) ABSTRACT

A scheduling apparatus for dynamically setting a size of a rotating register of a local register file during runtime ids provided. The scheduling apparatus may include a determiner configured to determine whether a non-rotating register of a central register file is sufficient to schedule a program loop; a selector configured to select at least one local register file to which a needed non-rotating register is allocated in response to a determination that the non-rotating register of a central register file has a size which is sufficient to loop a program loop; a scheduler configured to schedule a non-rotating register of the at least one selected local register file.

17 Claims, 7 Drawing Sheets

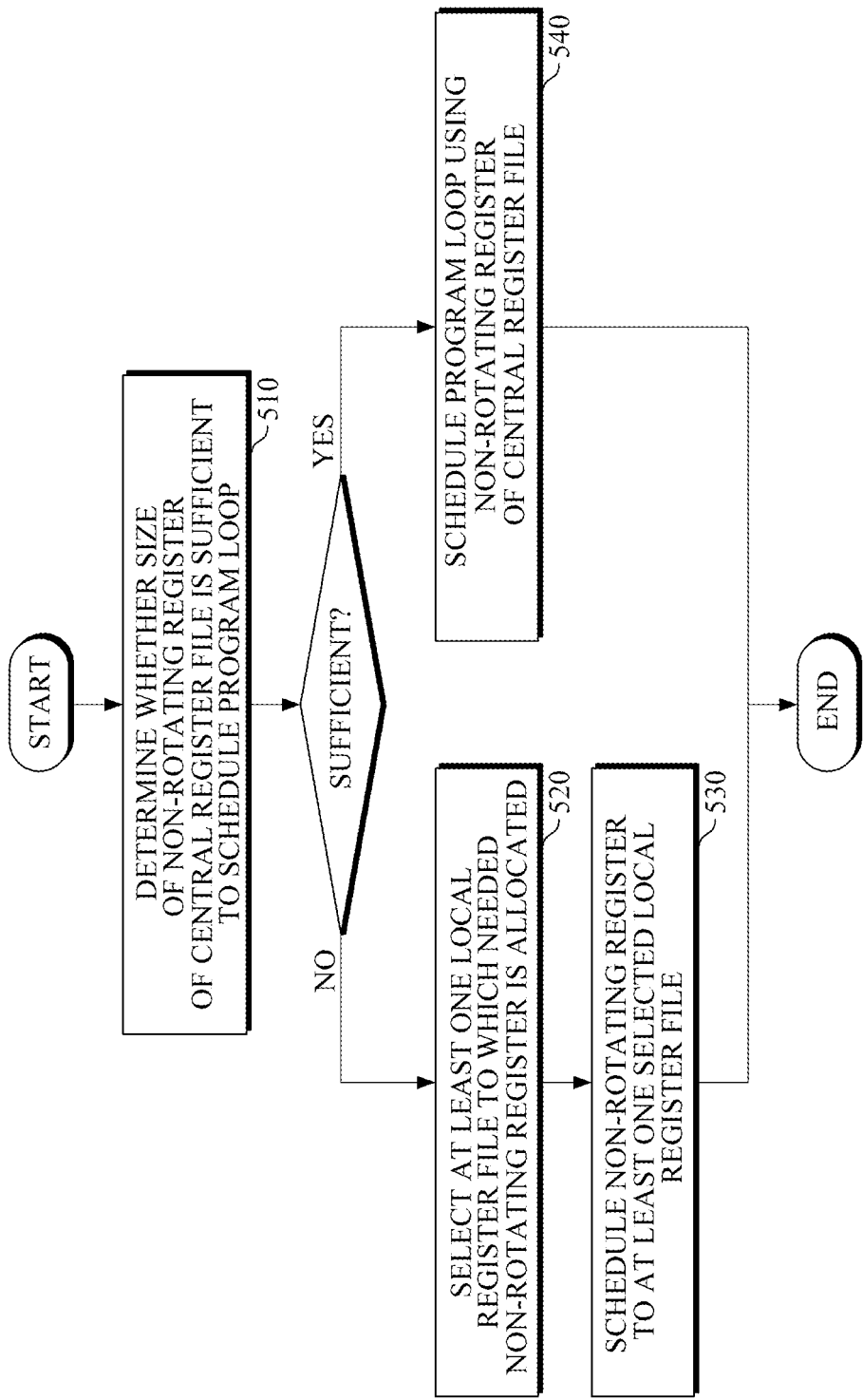

SCHEDULING APPARATUS AND METHOD OF DYNAMICALLY SETTING THE SIZE OF A ROTATING REGISTER

CROSS-REFERENCE TO RELATED APPLICATION(S)

This application claims priority under 35 U.S.C. §119(a) from Korean Patent Application No. 10-2013-0044432, filed on Apr. 22, 2013, in the Korean Intellectual Property Office, the entire disclosure of which is incorporated herein by reference, in its entirety.

BACKGROUND

1. Technical Field

The following description relates to a scheduling apparatus and a method of dynamically setting a size of a rotating register of a local register file during runtime.

2. Description of the Related Art

A central register file of a Coarse Grained Reconfigurable Array (CGAR) processor is largely divided into a non-rotating register and a rotating register. The non-rotating register is used to store live-in values and live-out values, and the rotating register is used to store temporary values. A size of the non-rotating register or the rotating register is usually determined when hardware is designed, so, in some cases, a size of a non-rotating register is not sufficient according to a live-in/out value of a program loop. It results an increase in overhead, thereby degrading processing performance.

SUMMARY

In one general aspect, there is provided a scheduling apparatus, including a determiner configured to determine whether a non-rotating register of a central register file has a size which is sufficient to schedule a program loop; a selector configured to, in response to a determination that the non-rotating register of a central register file has a size which is sufficient to schedule a program loop, select at least one local register file to which a needed non-rotating register is to be allocated; and a scheduler configured to schedule a non-rotating register to the at least one selected local register file.

The determiner may be further configured to determine whether the non-rotating register of the central register file has a size which is sufficient to schedule the program loop, by calculating a required size of a non-rotating register for the program loop and comparing the calculated size with the size of a non-rotating register of a central register file.

The determiner may be further configured to calculate the size of the non-rotating register of the central register file, based on a live-in/out value of the program loop.

The scheduler may be further configured to generate a rotating configuration instruction to request setting a size of a rotating register allocated to the at least one selected local register file.

The rotating configuration instruction may be executed before a processor switches from a Very Long Instruction Word (VLIW) mode to a Coarse Grained Array (CGA) mode.

The scheduler may be further configured to determine a register index to be loaded into a non-rotating register of the at least one selected local register file and generate a live-in/out value processing instruction using the determined register index.

The live-in/out value processing instruction may request that before the VLIW mode is switched to the CGA mode in the processor, a live-in value stored in the non-rotating register of the central register is loaded into the non-rotating register of the at least one selected local register file.

The live-in/out value processing instruction requests that, when the CGA mode is switched to the VLIW mode, a live-out value stored in the non-rotating register of the at least one selected local register file be loaded into the non-rotating register of the central register file.

In another exemplary embodiment, there is provided a scheduling method, including determining whether a non-rotating register of a central register file has a size which is sufficient to schedule a program loop; in response to a determination that the non-rotating register of the central register file does not have a size which is sufficient to schedule a program loop, selecting at least one local register file to which a needed non-rotating register is to be allocated; and scheduling a non-rotating register to the at least one selected local register.

The determining of whether the non-rotating register has a size which is sufficient to schedule a program loop may include calculating a required size of a non-rotating register for scheduling the program loop and comparing the calculated size with the size of the non-rotating register of the central register file.

The calculating of the required size of the non-rotating register may include calculating the required size of the non-rotating register, based on a live-in/out value of the program loop.

The scheduling of the non-rotating register may include generating a rotating configuration instruction to request setting a size of a rotating register of the at least one selected local register file.

The rotating configuration instruction may be executed before a Very Long Instruction Word (VLIW) mode is switched to a Coarse Grain Array (CGA) mode in a processor.

The scheduling method may further include determining a register index to be allocated to the non-rotating register of the at least one selected local register file; and generating a live-in/out value processing instruction using the determined register index.

The live-in/out processing instruction may request that, before the VLIW mode is switched to the CGA mode in a processor, a live-in value stored in the non-rotating register of the central register file be loaded into the non-rotating register of the at least one selected local register files.

The live-in/out processing instruction may request that, after the CGA mode is switched to the VLIW mode in a processor, a live-out value stored in the rotating register of the at least one selected local register file be loaded into the non-rotating register of the central register file.

An aspect of an exemplary embodiment may provide a scheduling apparatus, including: a determiner configured to determine whether a non-rotating register of a central register file has a sufficient size to schedule a program loop; and a selector configured to select at least one local register file to which a needed non-rotating register is allocated in response to a determination that the non-rotating register of a central register file does not have a size which is sufficient to schedule a program loop; wherein the determiner is further configured to determine whether the non-rotating register of the central register file has a size which is sufficient to schedule the program loop.

The scheduling apparatus may further include a scheduler configured to schedule a non-rotating register to the at least one selected local register file.

The determiner may determine whether the non-rotating register of the central register file has a size which is sufficient to schedule the program loop by calculating a required size of a non-rotating register for the program loop and comparing the calculated size with the size of a non-rotating register of a central register file.

The determiner may be further configured to calculate the size of the non-rotating register of the central register file based on a live-in/out value of the program loop.

Other features and aspects may be apparent from the following detailed description, the drawings and the claims.

BRIEF DESCRIPTION OF THE DRAWINGS

The accompanying drawings, which are included to provide a further understanding of the exemplary embodiments and are incorporated in and constitute a part of this specification, illustrate exemplary embodiments, and together with the description serve to explain the principles of the disclosed exemplary embodiments.

FIG. 5 is a flow chart which illustrates a scheduling method according to an exemplary embodiment.

Figure 1:
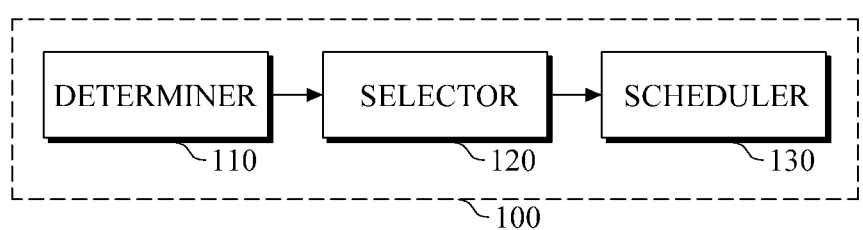
FIG. 1 is a block diagram which illustrates a scheduling apparatus according to an exemplary embodiment.

Throughout the drawings and the detailed description, unless otherwise described, the same drawing reference numerals will be understood to refer to the same elements, features, and structures. The relative size and depiction of these elements may be exaggerated for clarity, illustration and convenience.

DETAILED DESCRIPTION OF THE EXEMPLARY EMBODIMENTS

The following description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. Also, descriptions of well-known functions and constructions may be omitted for increased clarity and conciseness and to avoid obscuring the exemplary embodiments.

Hereinafter, a scheduling apparatus and a method of dynamically setting a size of a rotating register will be described in detail.

Figure 2:
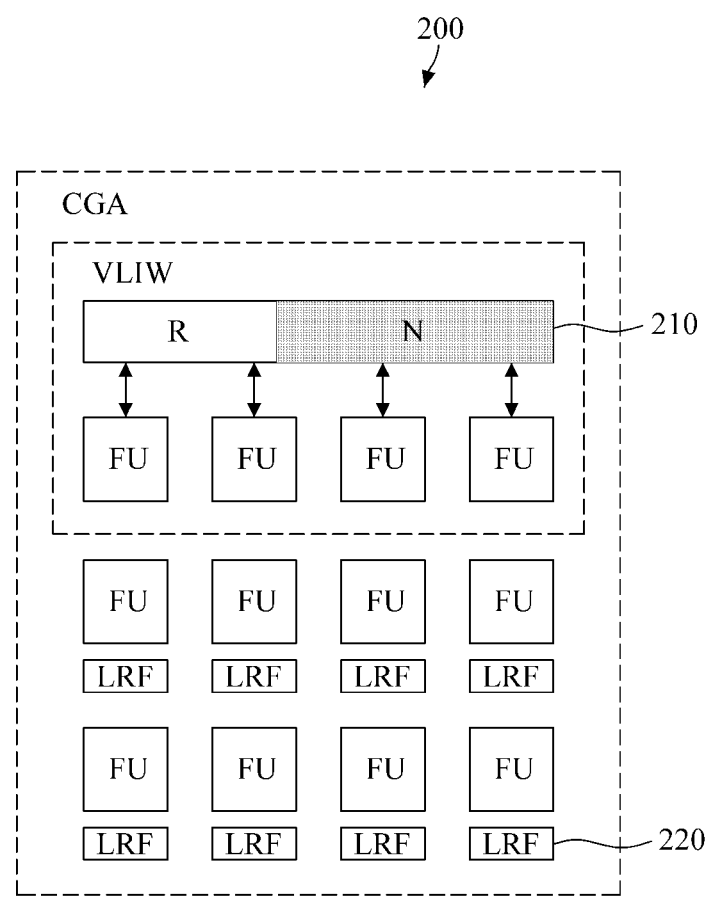
FIG. 2 is a diagram which illustrates a reconfigurable processor according to an exemplary embodiment.

FIG. 1 is a diagram which illustrates a scheduling apparatus according to an exemplary embodiment. FIG. 2 is a diagram which illustrates a reconfigurable processor according to an exemplary embodiment.

As illustrated in FIG. 2, a reconfigurable processor 200 includes a plurality of Functional Units (FUs) configured to process an operation or instruction, a central register file 210 and a local register file 220. The central register file 210 and the local register file 220 are used to transfer data between a plurality of FUs or to store various operation results.

The reconfigurable processor 200 may operate in a Very Long Instruction Word (VLIW) mode to process general operations and in a Coarse-Grained Array (CGA) mode to process loop operation. At this point, data communication is possible through the central register file 210 between the VLIW mode and the CGA mode.

For example, in the VLIW mode, the reconfigurable processor 200 processes a plurality of instructions in a VLIW instruction word in parallel, using some FUs, and stores processing results thereof in the central register file 210. Before the VLIW mode is switched to the CGA mode to process a loop operation, live-in data to be used in the CGA mode is transferred from the central register file 210 to the local register file. Thus, an FU is able to retrieve data from the local register file 220 or writes back data in the local register file 220.

As shown in FIG. 2, the central register file 210 may be divided into a rotating register R to store temporary data of an execution result of an FU and a non-rotating register N to store a live-in/out value of the CGA mode. The size of the rotating register R and the non-rotating register N may be determined when designing architecture. In response to the non-rotating register N, determined when architecture is designed, not having a size which is sufficient to store a live-in/out value, overheads may increase.

Referring to FIGS. 1 and 2, with the reconfigurable processor 200 processing an operation, in response to the non-rotating register N of the central register file 210 not having a size which is sufficient to store live-in/out data, the scheduling apparatus 100 dynamically allocates a non-rotating register to the local register file 220 so as to process the operation without overhead costs. The local register file 220 is usually configured as a rotating register to store temporary data in a CGA mode.

As shown in FIG. 1, the scheduling apparatus 100 includes a determiner 110, a selector 120 and a scheduler 130. The determiner 110, the selector 120 and the scheduler 130 are distinguished logically, and instead may be integrated into one body by combining two or more thereof. In addition, logical functions of the elements 110, 120 and 130 are described simply for convenience of explanation; so some functions of one element may be performed by another element without departing from the spirit and scope of the exemplary embodiments.

The determiner 110 determines whether a non-rotating register of the central register file 210 has a size which is sufficient to schedule a program loop. For example, the determiner 110 may calculate a required size of a non-rotating register file by analyzing a live-in/out value of a program loop to be processed by the reconfigurable processor 200 in a CGA mode. The determiner 110 then compares the calculated size of a non-rotating register with a size of the non-rotating register N of the central register file 210 to determine whether a size of the non-rotating register N of the central register file 210 is sufficient to schedule a program loop. For example, in the case where a value obtained by subtracting a size of the non-rotating register N from the calculated size of a non-rotating register exceeds a predetermined threshold, it may be determined that a size of the non-rotating register N of the central register file 210 is not sufficient to schedule a program loop.

In response to a determination that the non-rotating register N does not have a size which is sufficient to schedule a program loop, the selector 120 may select, by taking into consideration interconnection between the FUs, at least one local register file to which a needed non-rotating register is to be allocated.

The scheduler 130 schedules a non-rotating register of each of the selected local registers. In addition, the scheduler 130 generates a VLIW instruction word to request processing a general operation in a VLIW mode, and generates an instruction code request to process a loop operation in a CGA mode.

For example, in the case where the selector 120 selects at least one local register file, the scheduler 130 may generate a rotating configuration instruction to request the setting of a size of a rotating register of each of the selected local registers. The rotating configuration instruction may be generated before the reconfigurable processor 200 switches a VLIW mode to a CGA mode. Each rotating register of the selected local register files may be set to have a different size. In addition, by determining a size of a rotating register size of a local register file 220, it is possible to determine a size of a non-rotating register N thereof.

The scheduler 130 may determine an index to be transferred from each of the selected local register files to a non-rotating register thereof, and the reconfigurable processor 200 may generate a live-in/out value processing instruction using the determined index.

The live-in/out value processing instruction may include a code requesting to transfer a live-in value stored in a non-rotating register of the central register file 210 to a non-rotating register of each selected register file before the reconfigurable processor 200 switches a VLIW mode to a CGA mode In addition, the live-in/out value processing instruction may include requesting to transfer a live-out value stored in each local register file to the non-rotating register of the central register file after the reconfigurable processor 200 processes a loop operation in a CGA mode and then switches the CGA mode to the VLIW mode.

Meanwhile, in response to the determiner 110 determining that the non-rotating register N of the central register file 210 has a size which is sufficient to schedule a program loop; the scheduler 130 may perform scheduling to process a live-in/out value using the non-rotating register N. In addition, the scheduler 130 may generate an instruction to request. setting a size of a rotating register of the central register file.

Figure 3:
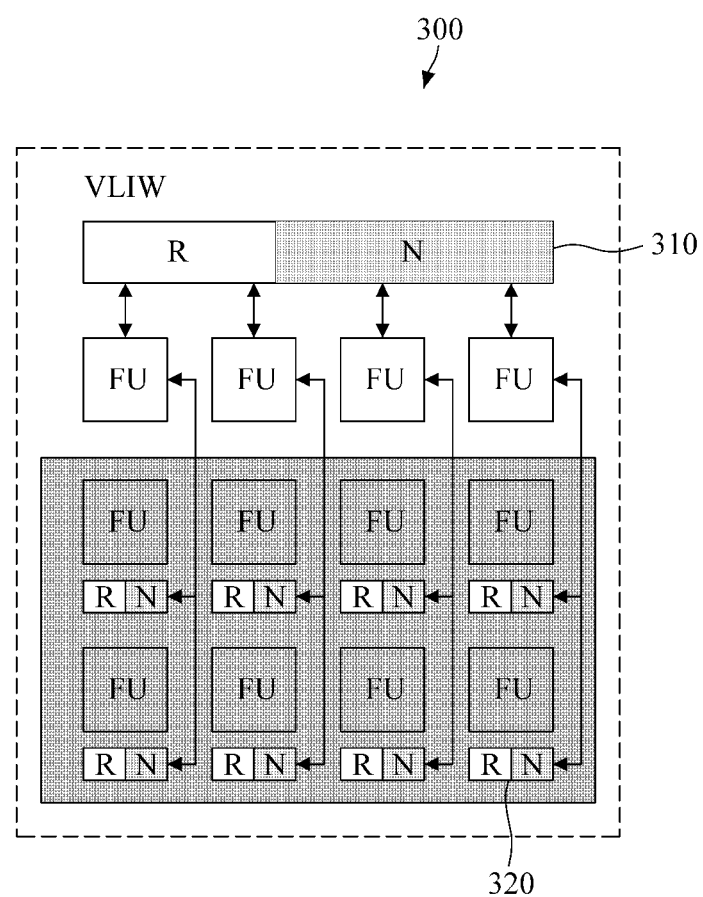
FIG. 3 is an example of a scheduling method in response to a reconfigurable processor being in a Very Long Instruction Word (VLIW) mode.

FIG. 3 is a scheduling example when a reconfigurable processor is in a VLIW mode according to an exemplary embodiment. Referring to FIGS. 1 to 3, the scheduling apparatus 100 may perform scheduling such that a reconfigurable processor 300 processes a general operation and a loop operation in a VLIW mode. In the VLIW mode, a plurality of FUs, which are configured to process a plurality of instruction in a VLIW instruction word in parallel, retrieve data from the central register file 310 or write back data in the central register file 310. As described above, in response to the non-rotating register N of the central register file 310 not having a size which is sufficient to process a live-in/out value, the scheduling apparatus 100 may perform scheduling by allocating a non-rotating register to each local register file 320 for retrieval and write-back of a live-in/out value. In FIG. 3, all the local register files 320 are allocated with respective non-rotating registers, but it is merely exemplary. That is, only some of the local registers may be allocated with non-rotating registers.

Figure 4A:
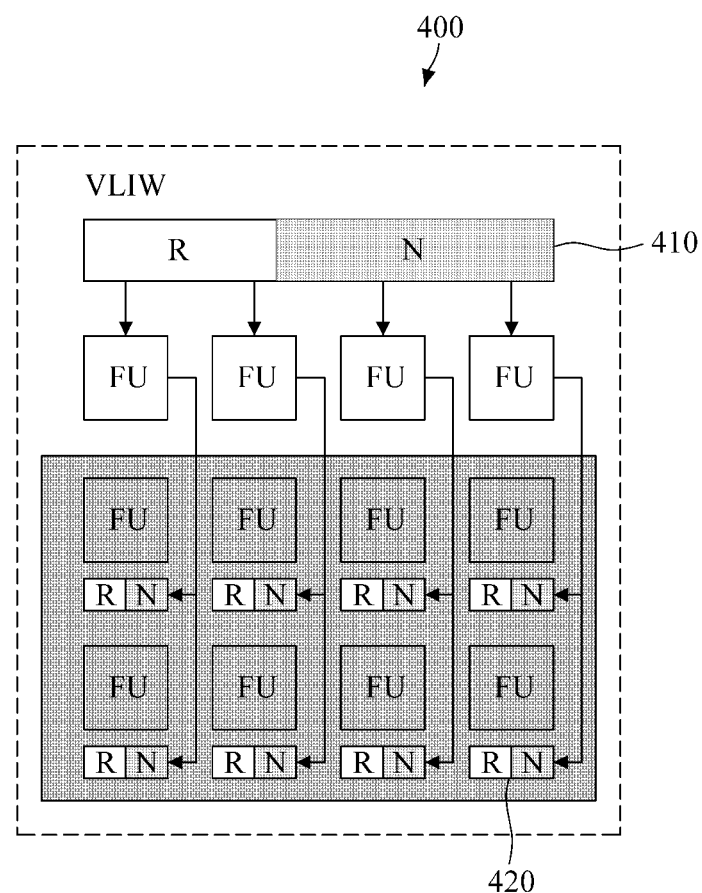
FIGS. 4A to 4C are examples of a scheduling method in response to a reconfigurable processor being in a Coarse Grain Array (CGA) mode.
Figure 4B:
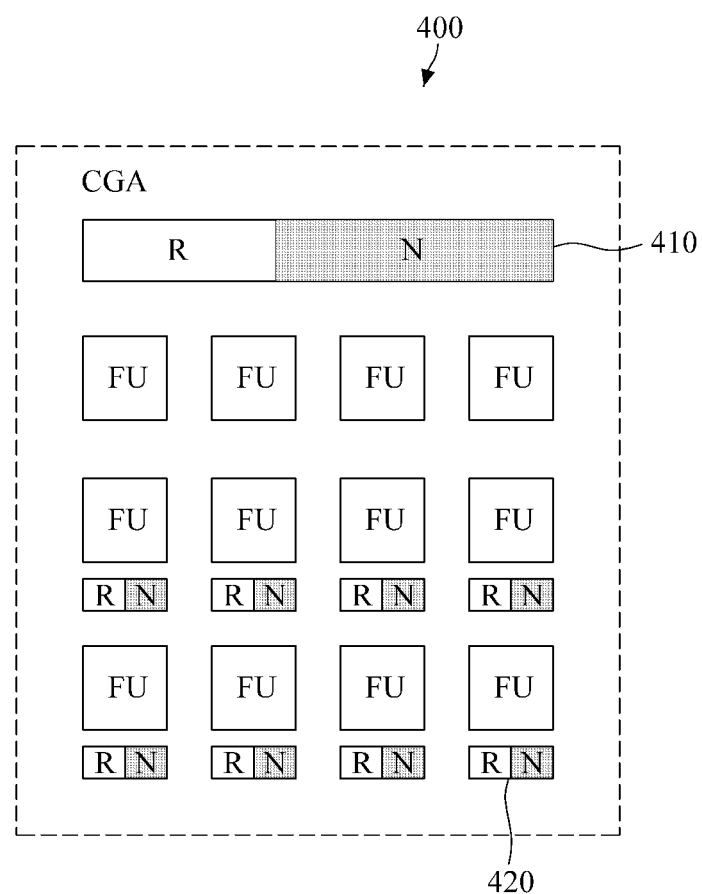
Figure 4C:
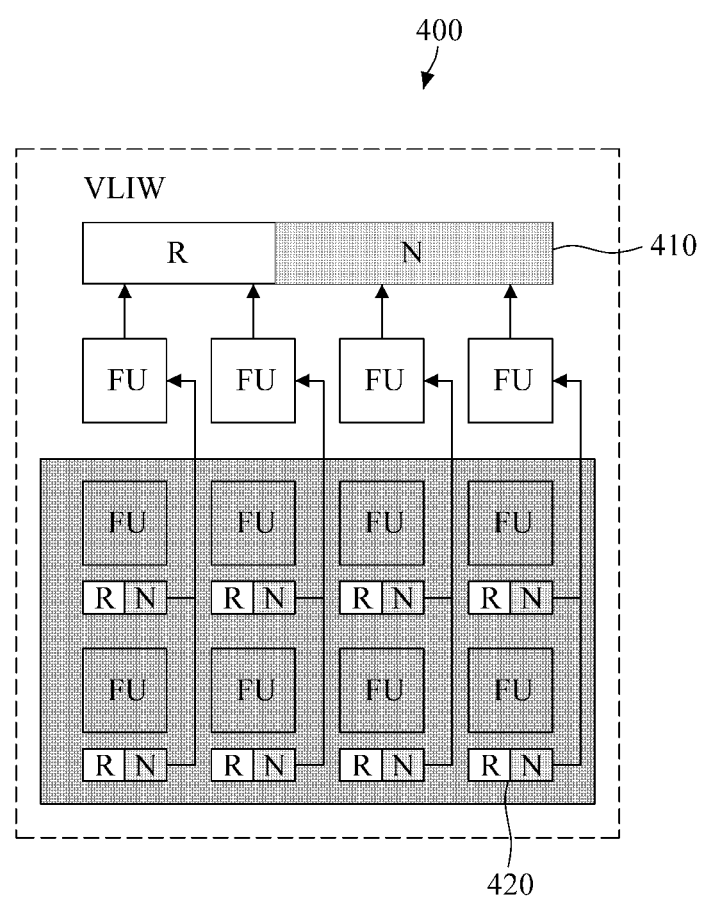

The determiner 110 of the scheduling apparatus 100 may determine whether the non-rotating register N of the central register file 310 has a size which is sufficient to process live-in/out data of a loop operation in a VLIW mode, and the selector 120 may select at least one local register file 320 according to a result of the determination. The scheduler 130 may generate a rotating configuration instruction to request setting a size of a rotating register of each selected local register file. Herein, the rotating configuration instruction may be processed before the loop operation is performed FIGS. 4A to 4C are scheduling examples in response to a reconfigurable processor being in a CGA mode according to an exemplary embodiment. Referring to FIGS. 1 and 4A to 4C, the scheduling apparatus 100 may perform scheduling such that a reconfigurable processor 400 processes a general operation in a VLIW mode while processing a loop operation in a CGA mode. For example, as described above, the scheduling apparatus 100 may generate an instruction, which includes a numerical value indicating a local register file to be allocated with a non-rotating register and an index to be transferred from a selected local register file to a non-rotating register file thereof. In addition, the instruction generated by the scheduling apparatus 100 may be an instruction to request processing of live-in/out data.

As shown in FIG. 4A, using the generated instruction, the reconfigurable processor 400 may transfer a live-in value stored in a non-rotating register N of the central register file 410 to a non-rotating register of a local register file before the reconfigurable processor 400 switches a VLIW mode to a CGA mode. FIG. 4B is an example in which the reconfigurable processor 400 processes a loop operation using the at least one local register file 420 allocated with a respective non-rotating register. FIG. 4C is an example in which the reconfigurable processor 400 in a VLIW mode switched over to a CGA mode again. Specifically, after the scheduling apparatus 100 processes a loop operation in a CGA mode and then generates a processing result according to a live-out value processing instruction, the reconfigurable processor 400 may transfer a live-out value stored in a non-rotating register of a local register file 420 to a non-rotating register of the central register file 410.

FIG. 5 is a flow chart which illustrates a scheduling method according to an exemplary embodiment. The scheduling method shown in FIG. 5 may be implemented by the scheduling apparatus 100 shown in FIG. 1.

The scheduling apparatus 100 determines whether a non-rotating register of a central register file has a size which is sufficient to schedule a program loop in 510. Specifically, the scheduling apparatus 100 calculates a required size of a non-rotating register by analyzing a live-in/out value for each program loop and then compares the calculated size of a non-rotating register with a size of a non-rotating register of the central register file, so that whether a non-rotating register of a central register file has a size which is sufficient to schedule a program loop may be determined. For example, in the event that the calculated size of a non-rotating register is greater than a size of the non-rotating register of the central register file or that a value obtained by subtracting a size of the non-rotating register of the central register file from the calculated size of a non-rotating register exceeds a predetermined threshold, the scheduling apparatus 100 may determine that the non-rotating register of the central register file does not have a size which is sufficient to schedule a program loop.

Then, in response to a determination that the calculated size of a non-rotating register is not sufficient to schedule a program loop, the scheduling apparatus 100 selects, based on interconnection between the FUs, at least one local register file to which a needed non-rotating register is to be allocated in 520.

Then, the scheduling apparatus 100 schedules a non-rotating register to each selected local register file in 530. In addition, the scheduling apparatus 100 generates a VLIW instruction word to request that the reconfigurable processor 200 process a general operation in a VLIW mode, and generates various instructions to request that the reconfigurable processor 200 process a loop operation in a CGA mode.

For example, in the case where at least one local register file is selected, the scheduling apparatus 100 may generate a rotating configuration instruction to request setting a size of a rotating register of each selected local register file. In addition, the scheduling apparatus 100 may designate a numerical value assigned to each selected local register and an index to be transferred from each selected local register into a non-rotating register thereof. Further, the scheduling apparatus may generate an instruction to request processing a live-in/out value using the index. At this point, the rotating configuration instruction may be generated before the reconfigurable processor switches a VLIW mode to a CGA mode.

For example, in order to process a loop operation in response to the reconfigurable processor being in a VLIW mode, the live-in/out processing instruction may include a code to request transferring a live-in value stored in a non-rotating register of the central register file 210 to a non-rotating register of each selected register file before the reconfigurable processor switches a VLIW mode to a CGA mode. In addition, the live-in/out processing instruction may include a code to request transferring a live-out value stored in each local register file to the non-rotating register of the central register file after the reconfigurable processor processes a loop operation in a CGA mode and then switches the CGA mode to the VLIW mode.

Meanwhile, in response to a determination being made in 510 that the non-rotating register of the central register file has a size which is sufficient to schedule a program loop, the scheduling apparatus 100 performs scheduling.

The methods and/or operations described above may be recorded, stored, or fixed in one or more non-transitory computer-readable storage media that includes program instructions to be implemented by a computer in order to cause a processor to execute or perform the program instructions. The media may also include, alone or in combination with the program instructions, data files, data structures, and the like. Examples of computer-readable storage media include magnetic media, such as hard disks, floppy disks, and magnetic tape; optical media such as CD ROM disks and DVDs; magneto-optical media, such as optical disks; and hardware devices that are specially configured to store and perform program instructions, such as read-only memory (ROM), random access memory (RAM), flash memory, and the like. Examples of program instructions include machine code, such as produced by a compiler, and files containing higher level code that may he executed by the computer using an interpreter. The described hardware devices may be configured to act as one or more software modules in order to perform the operations and methods described above, or vice versa. In addition, a computer-readable storage medium may be distributed among computer systems connected through a network and computer-readable codes or program instructions may be stored and executed in a decentralized manner.

A number of examples have been described above. Nevertheless, it should be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A scheduling apparatus, comprising:
a determiner configured to determine whether a non-rotating register of a central register file has a size which is sufficient to schedule a program loop, by calculating a required size of a non-rotating register for the program loop and comparing the calculated size with the size of a non-rotating register of a central register file;
a selector configured to select at least one local register file to which a needed non-rotating register is allocated in response to a determination that the non-rotating register of a central register file does not have a size which is sufficient to schedule a program loop; and
a scheduler configured to schedule a non-rotating register to the at least one selected local register file,
wherein in response to the determination that the non-rotating register of the central register file has a size which is sufficient to schedule a program loop, the scheduler configured to schedule a non-rotating register to the central register file.

2. The scheduling apparatus of claim 1, wherein the determiner is further configured to calculate the size of the non-rotating register of the central register file based on a live-in/out value of the program loop.

3. The scheduling apparatus of claim 1, wherein the scheduler is further configured to generate a rotating configuration instruction to request setting a size of a rotating register allocated to the at least one selected local register file.

4. The scheduling apparatus of claim 3, wherein the rotating configuration instruction is executed before a processor switches from a Very Long Instruction Word (VLIW) mode to a Coarse Grained Array (CGA) mode.

5. The scheduling apparatus of claim 1, wherein the scheduler is further configured to determine a register index to be loaded into a non-rotating register of the at least one selected local register file and generate a live-in/out value processing instruction using the determined register index.

6. The scheduling apparatus of claim 5, wherein the live-in/out value processing instruction requests that before a VLIW mode is switched to a CGA mode in the processor, a live-in value stored in the non-rotating register of the central register be loaded into the non-rotating register of the at least one selected local register file.

7. The scheduling apparatus of claim 5, wherein the live-in/out value processing instruction requests that a live-out value stored in the non-rotating register of the at least one selected local register file be loaded into the non-rotating register of the central register file, in response to a CGA mode being switched to a VLIW mode.

8. A scheduling method, comprising:
determining whether a non-rotating register of a central register file has a size which is sufficient to schedule a program loop, the determining comprising calculating a required size of a non-rotating register for scheduling the program loop and comparing the calculated size with the size of the non-rotating register of the central register file;
in response to a determination that the non-rotating register of the central register file does not have a size which is sufficient to schedule a program loop, selecting at least one local register file to which a needed non-rotating register is allocated; and scheduling a non-rotating register to the at least one selected local register, wherein in response to the determination that the non-rotating register of the central register file has a size which is sufficient to schedule a program loop, the scheduling of the non-rotating register comprises scheduling to the central register file.

9. The scheduling method of claim 8, wherein the calculating of the required size of the non-rotating register comprises calculating the required size of the non-rotating register based on a live-in/out value of the program loop.

10. The scheduling method of claim 8, wherein the scheduling of the non-rotating register comprises generating a rotating configuration instruction to request setting a size of a rotating register of the at least one selected local register file.

11. The scheduling method of claim 10, wherein the rotating configuration instruction is executed before a Very Long Instruction Word (VLIW) mode is switched to a Coarse Grain Array (CGA) mode in a processor.

12. The scheduling method of claim 8, further comprising:

determining a register index to be allocated to the non-rotating register of the at least one selected local register file; and generating a live-in/out value processing instruction using the determined register index.

13. The scheduling method of claim 12, wherein the live-in/out processing instruction requests that before a VLIW mode is switched to a CGA mode in a processor, a live-in value stored in the non-rotating register of the central register file is to be loaded into the non-rotating register of the at least one selected local register file.

14. The scheduling method of claim 12, wherein the live-in/out processing instruction requests that after a CGA mode is switched to a VLIW mode in a processor, a live-out value stored in the rotating register of the at least one selected local register file is to be loaded into the non-rotating register of the central register file.

15. A scheduling apparatus, comprising:

a determiner configured to determine whether a non-rotating register of a central register file has a sufficient size to schedule a program loop, by calculating a required size of a non-rotating register for the program loop and comparing the calculated size with a size of a non-rotating register of a central register file; and a selector configured to select at least one local register file to which a needed non-rotating register is allocated in response to a determination that the non-rotating register of a central register file does not have a size which is sufficient to schedule a program loop.

16. The scheduling apparatus of claim 15, further comprising a scheduler configured to schedule a non-rotating register to the at least one selected local register file, wherein in response to the determination that the non-rotating register of the central register file has a size which is sufficient to schedule a program loop, the scheduler configured to schedule the non-rotating register to the central register file.

17. The scheduling apparatus of claim 15, wherein the determiner is further configured to calculate the size of the non-rotating register of the central register file based on a live-in/out value of the program loop.

* * * * *